Jan. 29, 1952.  H. G. KEHBEL  2,583,854
INDUCTANCE COIL WITH CERAMIC FORM FOR HIGH-FREQUENCY
Filed Oct. 5, 1949  2 SHEETS—SHEET 1
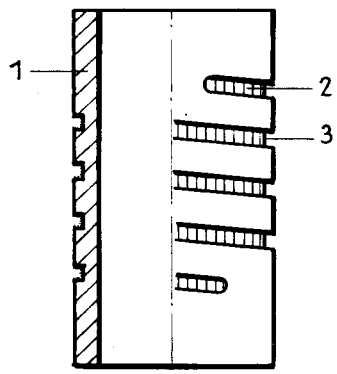
Fig.1
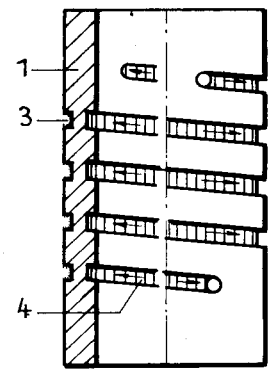
Fig.2
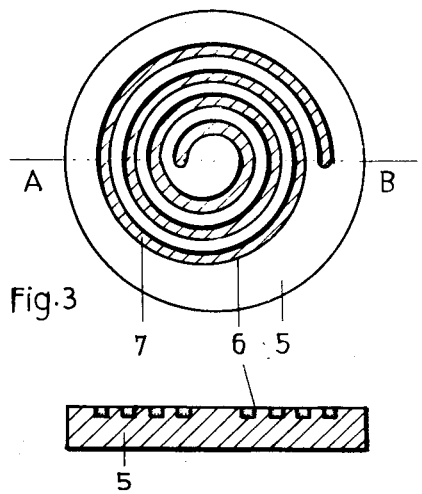
Fig.3
Fig.3a
(A-B)
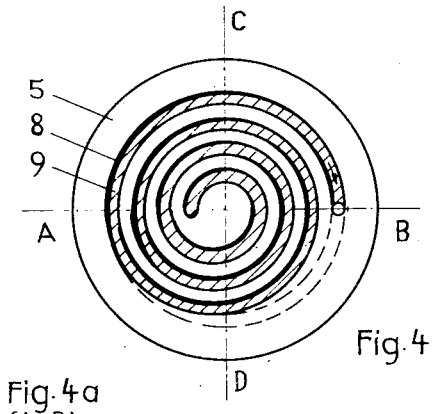
Fig.4
Fig.4a
(A-B)
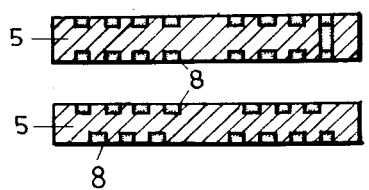
Fig.4b
INVENTOR.
Heinz Georg Kehbel.
BY C. M. Avery
ATTORNEY Jan. 29, 1952     H. G. KEHBEL     2,583,854
INDUCTANCE COIL WITH CERAMIC FORM FOR HIGH-FREQUENCY
Filed Oct. 5, 1949     2 SHEETS—SHEET 2

INVENTOR.
Heinz Georg Kehbel.
BY
ATTORNEY

Patented Jan. 29, 1952

2,583,854

UNITED STATES PATENT OFFICE 2,583,854

INDUCTANCE COIL WITH CERAMIC FORM FOR HIGH FREQUENCY

Heinz Georg Kehbel, Bavaria, Germany, assignor to Siemens-Schuckertwerke Aktiengesellschaft, Berlin-Siemensstadt, Germany, a corporation of Germany Application October 5, 1949, Serial No. 119,619
In Germany October 1, 1948

13 Claims. (Cl. 171—242)

This invention relates to inductance coils for alternating - current circuits, particularly for high-frequency applications.

Heretofore, as a rule, such coils were designed to have minimum distributed capacitance. This was done because of the uncontrollable losses of the distributed capacitance of coils wound on carriers with appreciable dielectric losses and because of the non-defined temperature-responsive variations of the distributed capacitance and its losses.

It is an object of the invention to provide a coil structure of high distributed capacitance but low dielectric losses which greatly reduces or eliminates the above-mentioned disadvantages. Another object of the invention is to devise a coil whose distributed capacitance is not only usefully high but also adjustable or regulatable. Still another object of the invention is to provide coil structures with distributed capacitance whose frequency or other operating characteristic is not affected by thermal changes or responds to temperature in accordance with a desired or adjusted dependency.

In accordance with the invention, an inductance coil structure is equipped with a carrier of a ceramic material having a high dielectric constant and a low dielectric loss factor, preferably of titanium dioxide ($TiO_2$) or a ceramic mass containing titanium dioxide. This ceramic carrier has turns of grooves in which the coil conductor is located. The coil conductor material consists preferably of noble or inert metal and is deposited not only on the bottom of the groove but also on its side faces. The metallization is preferably effected under heat, i. e. by firing of the metal coating. The coil grooves of the carrier are helically or spirally arranged dependent upon whether the carrier is cylindrical or flat. The desired value of distributed capacitance is obtained with cylindric carriers by correspondingly selecting the winding pitch, and with flat carriers by selecting a proper radial distance between the winding turns. In both cases, the depth of the coil grooves can also be chosen or enlarged to obtain the desired capacitance value. Also for obtaining a given distributed capacitance, the wall thickness of the coil carrier may be varied between that of a thin-walled hollow cylinder and a full cylinder. For the same purpose, the inner surface of a hollow cylindric coil carrier may be completely or partially metallized. It is furthermore possible to extend the turns of the coil from the outside of the hollow cylinder over the inner cylinder side, the thicknesses of the cylinder wall being suitably dimensioned.

According to another feature of the invention, the distributed capacitance of the coil structure is made adjustable or regulatable by providing for a continuous or stepwise insertion of a ceramic material of high dielectric constant and low dielectric losses into the field of the distributed coil capacitance. For instance, with a cylindric coil structure, a cylindric body of a ceramic material of high dielectric constant and low dielectric losses is either displaceably inserted into the coil carrier, or encloses the coil, or forms both an inserted core and an enclosure. With flat coil structures, the adjustably insertable ceramic body may be placed between two flat coil units which are electrically series or parallel connected with each other. For individual flat coils, the inserted ceramic body may consist of a cover-shaped overlapping plate on one or both sides of the coil. In these various embodiments of capacitance-controllable coil structures, the adjustable ceramic body to be inserted in the capacitance field may either be non-metallized or it may be partially or fully metal coated. Such coil structures of controllable distributed capacitance are especially advantageous for coarse or fine frequency regulation, thus obviating the necessity of providing other variable capacitance members in the oscillatory circuit. This kind of fine regulation of the frequency of oscillatory circuits is especially desirable for transmitting, receiving, and measuring high-frequency devices.

According to another feature of the invention, the continuous or stepwise insertion of a ceramic body into the field of the coil is utilized for providing a coil structure with a controllable temperature-frequency characteristic. This is achieved by giving the ceramic body to be gradually or incrementally inserted into the coil capacitance field, a temperature coefficient opposing that of the coil carrier.

The foregoing and more specific objects, advantages and features of the invention will be apparent from the following description of the embodiments of the invention illustrated in the drawing, in which:

Figures 1 and 2 are part-sectional illustrations of two respective embodiments of cylindrical coil structures;

Fig. 3 is a top view and Fig. 3a a corresponding cross-section of a flat coil structure;

Fig. 4 is a top view of another embodiment of a flat coil structure, Fig. 4a is a cross-section in the plane denoted in Fig. 4 by A—B, and Fig. 4b is a cross-section in the plane denoted in Fig. 4 by C—D.

Fig. 8 is a top view of a flat coil structure also of controllable distributed capacitance, while

Figure 5:
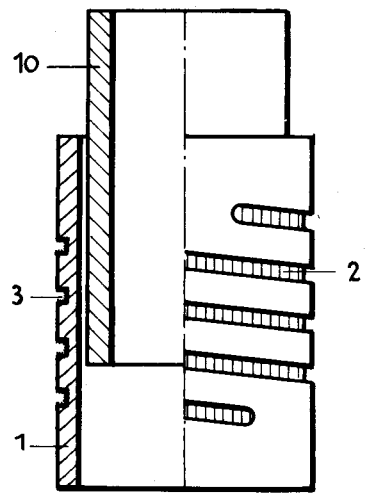
Figs. 5, 6 and 7 show three different embodiments of cylindrical coil structures of controllable distributed capacitance.

The coil structure shown in Fig. 1 has a coil carrier 1 shaped as a hollow cylinder. This carrier cylinder consists of a molded and sintered ceramic material with a high dielectric constant and a low loss factor, preferably of titanium dioxide or a material containing a substantial amount of titanium dioxide, although other ceramic materials of comparable dielectric qualities are also applicable. The cylindrical carrier 1 has a helical groove 2 on its exterior cylindrical surface. The coil conductor proper consists of a metal coating 3 on the bottom and side walls of the groove. The conductor metal is preferably a noble metal or a metal inert to the ambient atmosphere and is preferably fired on the grooved surfaces. In this manner, the coil conductor is intimately and rigidly joined with the ceramic carrier material.

The embodiment according to Fig. 2 has a rigid coil carrier 1 shaped as a hollow cylinder with helical exterior grooves 3 for receiving the coil turns. In addition, the interior surface of the cylindric carrier 1 is also equipped with a helical groove. This groove communicates through openings in the cylinder wall with the exterior groove 3. The surfaces of the interior groove are also coated with the conductor metal and the inner and outer coil conductor are electrically interconnected, in series or parallel relation, through the just-mentioned wall openings.

According to Figs. 3 and 3a, a coil carrier 5 is shaped as a flat disk. One of the disk surfaces has a spiral-shaped groove 6 equipped with the metal coating 7 that forms the coil conductor.

The coil structure shown in Figs. 4, 4a and 4b is similar to the just-mentioned embodiment except that the ceramic coil carrier 5 has spiral grooves 8 on both disk sides, respectively. The coil conductor is disposed in these grooves and extends through a transverse opening.

In the above-described embodiments as well as in those mentioned below, not only the bottom surface of the groove is metallized but preferably also the groove side walls. This aids in obtaining an increased distributed capacitance. The desired value of this capacitance is obtained by correspondingly dimensioning the groove, the pitch or spacing of its individual turns, and/or the wall thickness of the carrier.

The structure according to Fig. 5 has a coil carrier 1 designed substantially in accordance with the above-described embodiment of Fig. 1. However, the distributed capacitance of the coil structure in Fig. 5 is controllable by means of a hollow cylindrical ceramic body 10 which is inserted into the hollow coil carrier 1. The insert body 10 consists of a ceramic material with a high dielectric constant, for instance, of a titanium dioxide containing mass. The distributed capacitance of this coil structure can be adjusted or varied by axially displacing the insert 10 relative to the coil carrier 1 in a gradual or incremental manner.

In order to secure a given characteristic of the distributed capacitance relative to changes in temperature, the two bodies 1 and 10 may be given positive and negative temperature coefficients, respectively. For instance, the coil carrier 1 in Fig. 5 can be made of a ceramic material with a positive temperature coefficient, for instance, of magnesium silicate material, while the body 10 consists of a ceramic material with a negative temperature coefficient of capacitance such as sintered titanium dioxide. In this manner, any desired degree of capacitive temperature compensation can be obtained by the continuous or incremental relative adjustment of the two ceramic bodies.

Figure 6:
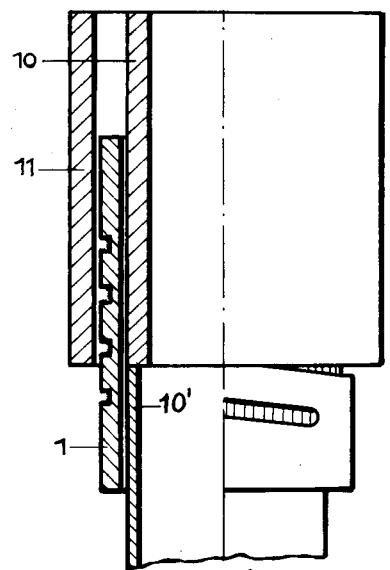
Figure 7:
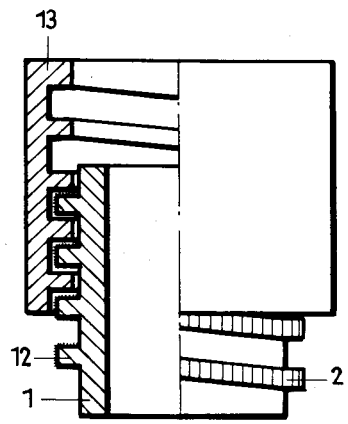
Figure 8:
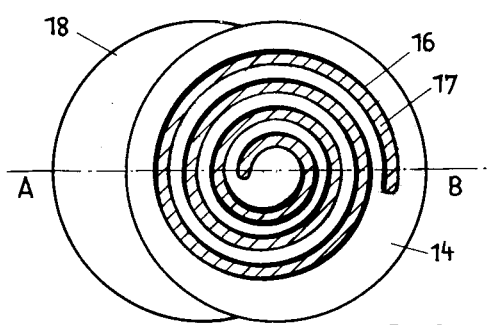
Figure 8A:
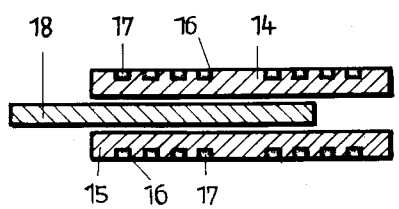
Fig. 8a shows a corresponding cross-section along the horizontal center plane of Fig. 8.

A controllable temperature-frequency characteristic can also be obtained with embodiments as shown in Figs. 6 to 8. To this end, the insert body must consist of a material whose temperature coefficient of capacitance is opposed to that of the coil carrier proper.

More in detail, the coil structure according to Fig. 6 has a coil carrier 1 designed substantially in accordance with Fig. 1. It has also an inner cylindric body 10 of a material with a high dielectric constant, and an exterior cylindric body 11 which surrounds the carrier 1 and consists also of a material with a high dielectric constant. The distributed capacitance of the coil changes in dependence upon how far the two bodies 10 and 11 are inserted into the capacitance field.

Together with the insertion of a hollow or full insert body, another body 10' may be connected with the insert so as to move out of the coil carrier when the above-mentioned insert 10 is moved into the carrier. The wall thickness of the outwardly moving body 10' relative to that of the inwardly moving body 10 is then inverse to the proportion of the responsive dielectric constants.

In the coil structure according to Fig. 7, the coil carrier 1 of a ceramic material of any suitable dielectric constant has the coil conductor 2 disposed on a male screw thread 12. An interiorly threaded hollow cylinder 13 is screwed onto the thread 12. The hollow cylinder 13 consists of a ceramic material with a high dielectric constant, and its position relative to carrier 1 determines the value of the distributed coil capacitance.

Fig. 8 shows a flat coil structure with two disk plates 14 and 15 of ceramic material whose exterior surfaces are equipped with grooves 16 which accommodate the metallic winding material 17. Another plate-shaped body 18 of a material with a high dielectric constant is inserted between the carrier plates 14 and 15. The degree of insertion determines the value of the distributed coil capacitance.

Coil structures with controllable temperature response of the frequency, for instance, corresponding to the embodiments of Figs. 5 to 8, are advantageous for use in oscillatory circuits of high frequency transmitting, receiving and measuring equipment. Such structures can also be designed so that a change in the adjustment of the insert body, causing a change in distributed capacitance, also changes the coil inductance so as to maintain a constant oscillatory frequency while varying the frequency-temperature characteristic in dependence upon the relative adjustment of the respective positively and negatively temperature responsive ceramic bodies.

I claim:

1. An electrical coil structure, particularly for high-frequency purposes, comprising a rigid ceramic carrier of a high dielectric constant and a small loss factor, said carrier having the shape of a hollow cylinder and having a helical groove on its exterior cylinder surface, and another helical groove on its inner surface, and a conductive coil material disposed in said two grooves.

2. An electrical coil structure, comprising a hollow cylindrical coil carrier of ceramic titanium dioxide material having a high dielectric constant and low losses, said carrier having a helical groove coil conductor means disposed in said groove, and a cylindric body of ceramic material having a high dielectric constant and low losses, said body being disposed within said carrier and axially displaceable relative thereto.

3. An electrical coil structure, comprising a cylindrical coil carrier of ceramic material containing titanium dioxide and having a high dielectric constant and low losses, said carrier having a helical groove coil conductor means in said groove, and a hollow cylindrical body around said carrier and axially displaceable relative thereto.

4. An electrical coil structure according to claim 2, comprising a second body of hollow cylindrical shape surrounding said carrier and displaceable relative thereto together with said first-mentioned body.

5. An electrical coil structure, comprising a flat carrier plate of ceramic material having a high dielectric constant and low losses, said plate having a spiral shaped groove, coil conductor means disposed on the walls of said groove, and a flat body of ceramic material having a high dielectric constant and low losses, said body being adjacent to said carrier in the capacitance field of said conductor means and being displaceable relative to said carrier.

6. An electrical coil structure, comprising two parallel and mutually spaced carrier plates of ceramic material having a high dielectric constant and low losses, coil conductor means disposed on said respective carriers and electrically connected with each other, and a flat body of ceramic material having a high dielectric constant and low losses, said body being displaceable between said carrier plates.

7. An electrical coil structure, particularly for high-frequency purposes, comprising a rigid ceramic coil carrier of titanium dioxide material, said carrier having groove turns, coil conductor means consisting of a metal coating on the wall surfaces of said groove turns and having distributed capacitance, and a ceramic body disposed near said carrier in the field of the distributed capacitance and displaceable relative to said carrier for controlling said capacitance.

8. In an electric coil structure according to claim 7, said ceramic body having a temperature coefficient of capacitance whose polarity is opposed to that of said carrier.

9. An electrical coil structure, comprising two coaxial bodies of ceramic material, one surrounding the other, and being axially displaceable relative to each other, said bodies consisting of ceramic materials of opposing temperature coefficients of capacitance respectively, and coil conductor means disposed on one of said bodies.

10. An electrical coil structure, particularly for high-frequency purposes, comprising a rigid ceramic coil carrier, coil means on said carrier, and two ceramic bodies disposed near said carrier in the capacitance field of said coil means and having opposing temperature coefficients respectively, said two bodies being displaceable relative to said carrier in relation to each other so that, when one body moves further into said field, said other body moves away therefrom, and said two bodies having respective thicknesses whose proportion is inverse to that of the respective dielectric constants of said bodies.

11. In an electric coil structure according to claim 7, said ceramic body having a temperature coefficient of capacitance whose polarity is opposed to that of said carrier so that a change in distributed capacitance due to displacement of said body is accompanied by a change in inductance whereby the natural frequency of the coil structure remains constant while its temperature characteristic is adjusted dependent upon the amount of displacement.

12. An electrical coil structure, particularly for high-frequency purposes, comprising a rigid ceramic carrier of titanium dioxide material having a high dielectric constant and a small loss factor, said carrier having the shape of a hollow cylinder and having a helical groove on its exterior cylinder surface, a metallic coil winding disposed in said groove and a metal coating on the inner surface of said hollow cylindrical carrier.

13. An electrical inductance structure, particularly for high-frequency purposes, comprising a rigid carrier of a titanium-dioxide containing ceramic material having the shape of a hollow cylinder and having helical turns of grooves on its cylindrical surface, said grooves having bottom and side faces, and an inductance winding disposed in said grooves and consisting of a metal coating on said bottom and side faces to provide appreciable distributed capacitance.

HEINZ GEORG KEHBEL.

REFERENCES CITED

The following references are of record in the file of this patent:

UNITED STATES PATENTS

| Number | Name | Date |
|---|---|---|
| 1,837,678 | Ryder | Dec. 22, 1931 |
| 2,137,392 | Cobb | Nov. 22, 1938 |
| 2,332,868 | Nowak | Oct. 26, 1943 |
| 2,394,670 | Detrick | Feb. 12, 1946 |

FOREIGN PATENTS

| Number | Country | Date |
|---|---|---|
| 592,501 | Great Britain | Sept. 19, 1947 |

OTHER REFERENCES

Publication — Printed Circuit Techniques— published by Bureau of Standards—No. 192— November 22, 1948.